(12) United States Patent
Cox

(10) Patent No.: US 10,954,056 B1
(45) Date of Patent: Mar. 23, 2021

(54) KNOCKDOWN COOLER

(71) Applicant: Jerry Roger Cox, Winston Salem, NC (US)

(72) Inventor: Jerry Roger Cox, Winston Salem, NC (US)

(*) Notice: Subject to any disclaimer, the term of this patent is extended or adjusted under 35 U.S.C. 154(b) by 383 days.

(21) Appl. No.: 16/039,778

(22) Filed: Jul. 19, 2018

(51) Int. Cl.
  *B65D 81/38* (2006.01)
  *F25D 3/06* (2006.01)
  *A47F 3/04* (2006.01)
  *F25D 23/02* (2006.01)

(52) U.S. Cl.
  CPC ........ *B65D 81/3825* (2013.01); *A47F 3/0404* (2013.01); *F25D 3/06* (2013.01); *F25D 23/026* (2013.01); *F25D 2303/082* (2013.01); *F25D 2303/0841* (2013.01); *F25D 2303/0843* (2013.01); *F25D 2323/061* (2013.01); *F25D 2331/804* (2013.01); *F25D 2400/16* (2013.01); *F25D 2400/38* (2013.01)

(58) Field of Classification Search
  CPC ....... F25D 2303/082; F25D 2303/0843; F25D 2303/083; F25D 2400/38; F25D 3/06; F25D 2331/804; F25D 2331/802; F25D 2400/18; F25D 2323/061; F25D 23/063; F25D 23/067; B65D 81/3825; B65D 81/383
  See application file for complete search history.

(56) References Cited

U.S. PATENT DOCUMENTS

| 4,344,300 | A | * | 8/1982 | Taylor | A45C 11/20 |
|  |  |  |  |  | 62/371 |
| 4,819,793 | A | * | 4/1989 | Willard | A45C 3/04 |
|  |  |  |  |  | 206/162 |
| 5,181,612 | A | * | 1/1993 | Liu | A45C 7/0036 |
|  |  |  |  |  | 206/542 |
| 5,533,361 | A | * | 7/1996 | Halpern | B62J 9/21 |
|  |  |  |  |  | 62/457.2 |
| 6,067,810 | A |  | 5/2000 | Jennings et al. | |
| 6,370,885 | B1 |  | 4/2002 | Jennings et al. | |
| 6,415,623 | B1 |  | 7/2002 | Jennings et al. | |
| 6,453,682 | B1 |  | 9/2002 | Jennings et al. | |
| 2007/0271947 | A1 | * | 11/2007 | Hase | B62B 5/0083 |
|  |  |  |  |  | 62/371 |
| 2009/0193837 | A1 | * | 8/2009 | Hamlin | F25D 3/08 |
|  |  |  |  |  | 62/457.5 |
| 2013/0340467 | A1 | * | 12/2013 | Kiedaisch | F25D 3/00 |
|  |  |  |  |  | 62/457.2 |
| 2014/0054297 | A1 | * | 2/2014 | Patstone | F25D 3/08 |
|  |  |  |  |  | 220/592.01 |

* cited by examiner

*Primary Examiner* — James N Smalley
*Assistant Examiner* — Jennifer Castriotta
(74) *Attorney, Agent, or Firm* — Tuggle Duggins P.A.; Blake P. Hurt

(57) ABSTRACT

A knockdown cooler with a number of removable chilling panels that cool an interior cavity of the cooler without exposing the contents therein to contact with unhygienic ice or water is provided. A collapsible storage member is positioned atop one or more structural support members to suspend the storage member in the chilling cavity, providing exposure to prolonged cooling impetus, a duration that may be prolonged if desired by removing and replacing one or more of the chilling panels without disrupting the contents of the cooler. A method of cooling items such as food, beverages, or the like without exposing the same to unhygienic ice or water in a knockdown cooler that can be assembled or disassembled without tools, mechanical fasteners, or adhesives is also provided.

14 Claims, 3 Drawing Sheets

KNOCKDOWN COOLER

FIELD OF THE INVENTION

The invention herein pertains to a cooler generally, and particularly pertains to a knockdown cooler that preserves refrigerated members via enclosed chilling panels without exposing said members to potentially contaminated ice or water.

DESCRIPTION OF THE PRIOR ART AND OBJECTIVES OF THE INVENTION

The use of a cooler to preserve food, beverages, and other items is known in the art. In the conventional embodiment, an enclosure is formed from a thermally resistant material such as foam or plastic, the enclosure capable of taking a wide variety of shapes but usually includes a floor, a plurality of walls, and a removable top. Some embodiments in the prior art include fans or other manner of electrical cooling components, but the basic models rely on the inclusion of refrigerated members such as water, ice, or chemical mixture(s) to maintain chilled temperatures within the enclosure, ideally for an extended period of time. Unfortunately, the use of water and/or ice, particularly in the amounts common in the commercial context, can be opportunistic breeding grounds for pests, bacteria, and other undesirable elements. The use of chemical coolants can reduce the presence of these undesirable elements, but can pose a significant number of health concerns to the items being cooled, particularly in the case of edible items such as fruit or vegetables that may not be washed thoroughly prior to consumption. Thus, in view of the problems and disadvantages associated with prior art cooling devices, the present invention was conceived and one of its objectives is to provide a hygienic cooler for the chilling of food, beverage, and other items.

It is another objective of the present invention to provide a cooler that can be easily knocked down for storage and transportation but that can be assembled easily and quickly for efficient cooling activity.

It is still another objective of the present invention to provide a cooler with a plurality of removable chilling members that can be inserted and removed from the cooler as desired for continuous cooling of items contained therein.

It is yet another objective of the present invention to provide a cooler with a plurality of removable chilling panels disposed annularly about a central storage section, one or more of which that can be inserted and removed from the cooler as desired for continuous cooling of items contained therein.

It is a further objective of the present invention to provide a mobile base with a plurality of apertures formed therein, the apertures sized and shaped to receive structural support members therein to increase the structural stability of the cooler when assembled and in use.

It is still a further objective of the present invention to provide a method of manufacturing a cooler including manufacturing components and packaging them in a single, 44"×28.5"×7" carton.

It is yet a further objective of the present invention to provide a method of cooling items including the steps of providing components of a mobile cooler in a 44"×28.5"×7" carton (i.e. "knocked down"), assembling the components into a functional cooler, and chilling desired members without the use of freely disposed ice or water.

Various other objectives and advantages of the present invention will become apparent to those skilled in the art as a more detailed description is set forth below.

SUMMARY OF THE INVENTION

The aforesaid and other objectives are realized by providing an improved, mobile, knockdown cooler that chills items stored therein without the use of unsecured water or ice that can cause potential health hazards. The improved cooler includes a geometric, polymeric bottom with a plurality of wheels, the bottom sized and shaped to support an insulating base with a plurality of apertures defined therein. The apertures are sized and shaped to each accommodate a cylindrical structural support member that supports the chilling cavity located above. The base also defines a number of fins formed in the surface to receive a portion of a collapsible wall support thereon. The wall support circumscribes the structural support members and ensures the positioning of chilling members therein and further ensures that a graphic panel that includes a cooperative geometric shape to that formed by the bottom does not fold in on the inner periphery of the cooler. An insulating top defines a geometric shape matching the graphic panel and a central opening and a plurality of recessed edges sized and shaped to receive and maintain a corresponding number of chilling members thereon. These removable chilling members, together with the graphic panel, insulating top, and a collapsible storage member, define an chilling cavity that is configured to receive and store food, beverages, or any other item that one may wish to keep at a predetermined thermal level without the use of unsecured water or ice. In the event the temperature begins to change, the removable chilling members may be swapped out without disturbing the items stored therein, all while maintaining a hygienic storage

DETAILED DESCRIPTION OF THE PREFERRED EMBODIMENT AND OPERATION OF THE INVENTION

Figure 1:
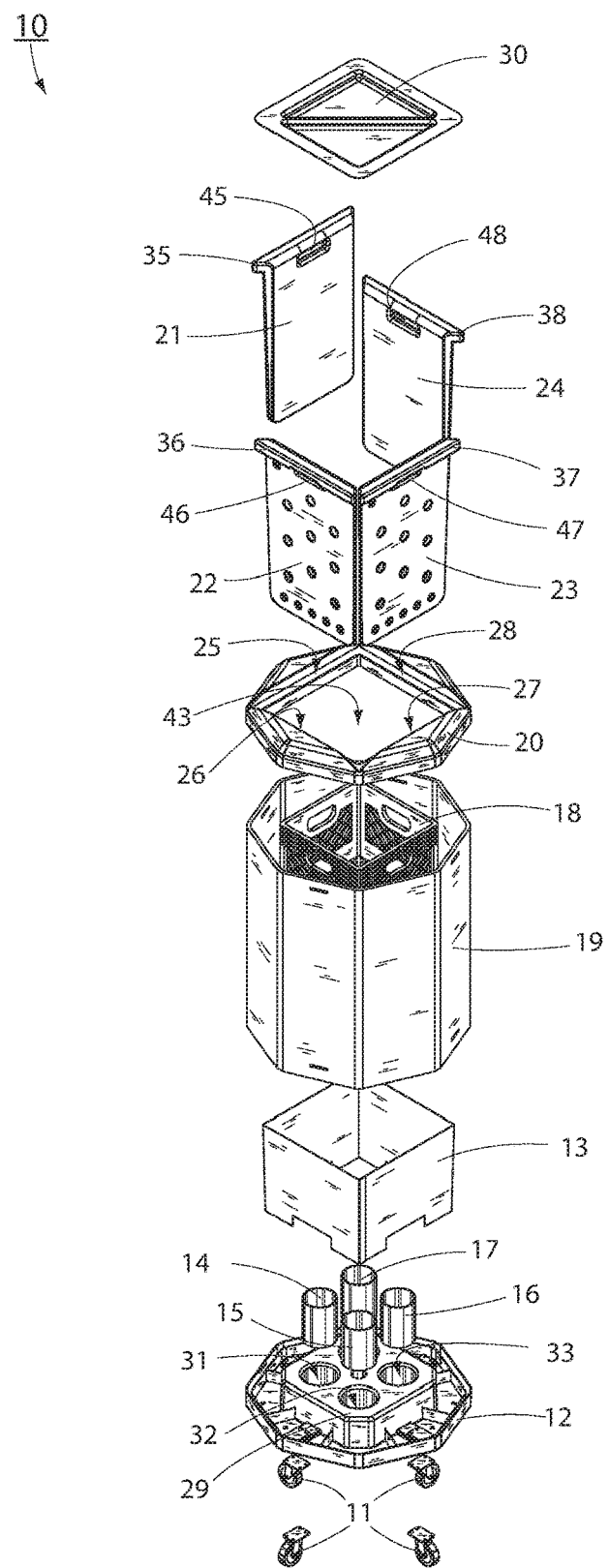
FIG. 1 shows an exploded perspective view of the components of an improved knockdown cooler.
Figure 2:
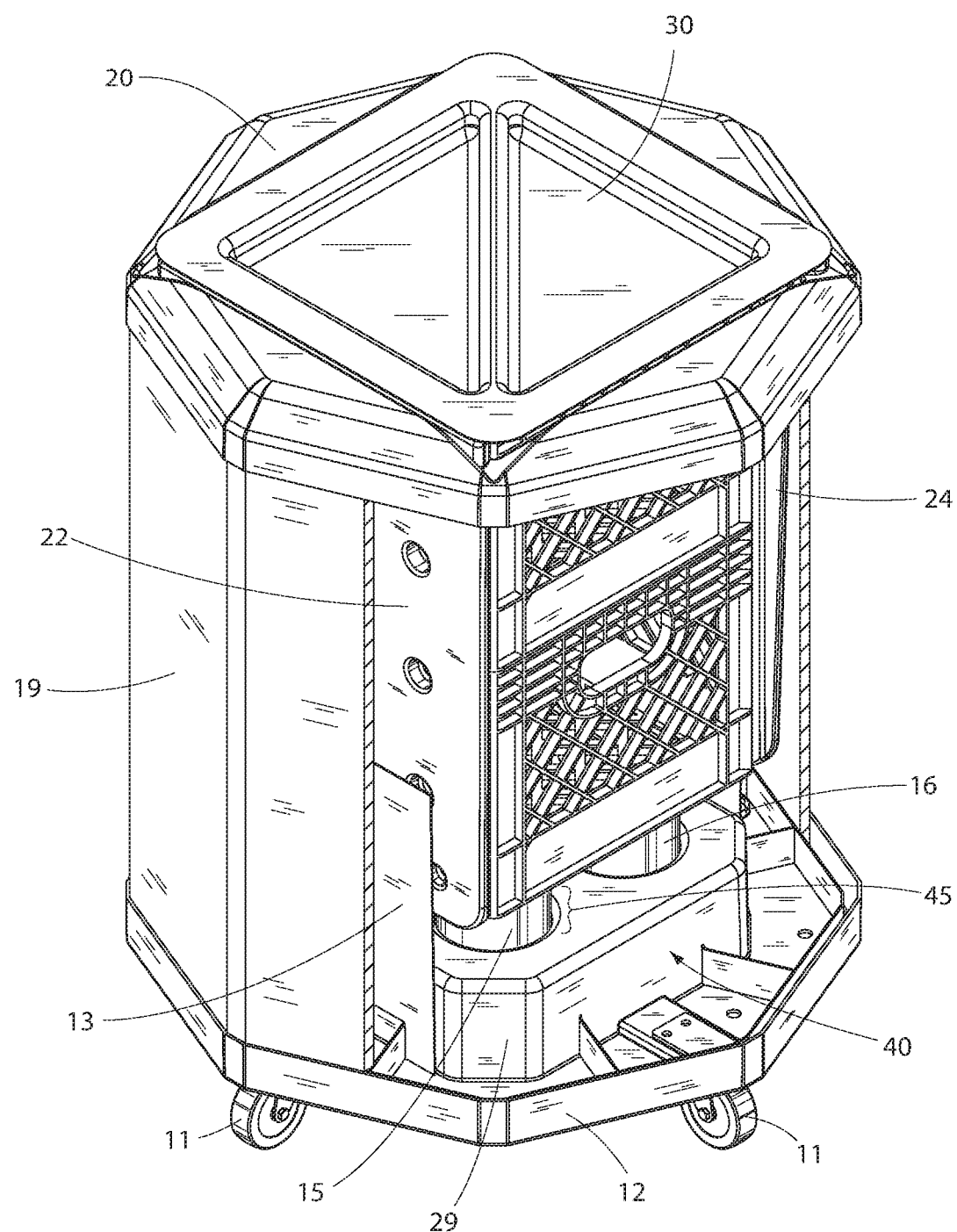
FIG. 2 pictures an elevated side section view of an assembled knockdown cooler.

For a better understanding of the invention and its operation, turning now to the drawings, FIGS. 1 and 2 illustrate exploded and assembled views of preferred cooler 10 including wheels 11 rotatably attached to bottom 12 that holds base 29, wall support 13 and a plurality of structural support members 14, 15, 16, and 17 that carry storage member 18 within graphic panel 19 beneath top 20 that defines a central opening 43 having inner recessed edges 25, 26, 27, and 28 for seating a plurality of removable chilling members 21, 22, 23, and 24, respectively. Lid 30 is sized to seat within chilling members 21, 22, 23, and 24 atop storage member 18. As used herein, the term "cooler" is intended to convey a substantially sealed enclosure that is thermally resistant to ambient temperature changes for a non-transitory amount of time. An embodiment of cooler 10 is considered a "knockdown" (sometimes referred to by the abbreviation "KD") cooler, in that it can be assembled or disassembled quickly and efficiently without the use of tools, and that no mechanical fasteners or permanent adhesives are required for its effective use.

Preferred wheels 11 are a rotatable, pivoting species of wheel conventionally known as a caster wheel that includes a mounting bracket, embodiments of which can be fixed or rotatable, the wheel body, and an axle that spans the mounting bracket and rotatably supports the wheel body. While any number of wheels 11 may be deployed for advantage, it may be advantageous to use three or more wheels 11 to facilitate ease of travel of cooler 10 in any direction. In the preferred embodiment of cooler 10, four wheels 11 are affixed to the underside of bottom 12.

Preferred bottom 12 is a geometric member formed from a rigid polymeric material that may serve as the mounting substrate for wheels 11. The shape of bottom 12 may vary, but in the preferred embodiment bottom 12 defines a complementary to, but slightly larger than, graphic panel 19. This configuration permits graphic panel 19 to frictionally nest within vertically extending side walls of bottom 12 that may hold graphic panel 19 in place for structural rigidity during use. Bottom 12 may also include a series of angularly disposed fins or ribs that extend a short distance from the respective side walls before terminating, defining a central opening in the middle of bottom 12 sized and shaped to receive base 29 therein. In the preferred embodiment, base 29 is a separate structure sized and shaped to be positioned within central opening of bottom 12 defined by the series of fins described above, but it should be understood that embodiments of base 29 integrally formed with bottom 12, for example by molding, should be within the scope of the instant invention. Preferred base 29 is a generally square shaped member defining one or more apertures 31, 32, 33, 34 therein. As will be described below, apertures 31, 32, 33, and 34 are sized and shaped to receive different ones of structural support members 14, 15, 16, and 17 therein. Base 29 and structural support members 14, 15, 16, 17 serve as the structural foundation for the components of cooler 10 as will be described in further detail below. As shown in FIG. 2, base 29 is sized and shaped to be within the central opening of bottom 12 defined by the series of fins described above, wall 13 includes central cutouts formed along the bottom edge of each side thereof and is sized and shaped to fit around base 29 such that the rectangular cutouts of wall support 13 are sized to slide overtop and engage the fins of bottom 12, specifically a pair of fins fit within each rectangular cutout, for snug, secure engagement.

An embodiment of wall support 13 is a resilient member formed out of a less rigid material such as paper, cardboard, plastic, or the like, and may include embodiments that easily collapse for storage and transportation when not in use. The preferred embodiment of wall support 13 is a substantially square member defining a size and shape that circumscribes base 29 such that cutouts formed along the bottom edge of each side thereof fit overtop and engage the fins of base 12 providing further stability and proper alignment thereof. Wall support 13 also defines the outer wall that restrains chilling members 21, 22, 23, 24 about the central chilling area within cooler 10, providing maximum chilling effect to the items stored therein.

Figure 3:
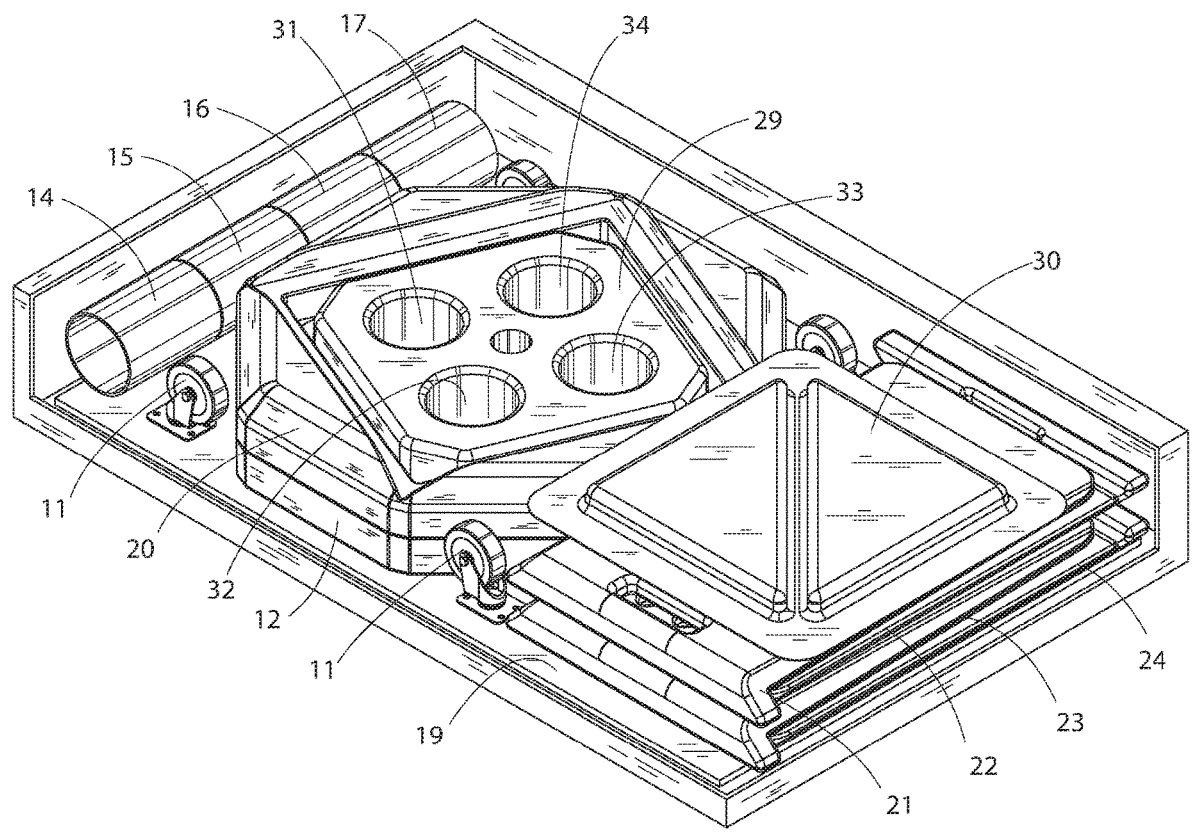
FIG. 3 depicts an elevated perspective section view of the packaged components of a knockdown cooler.

Preferably sized and shaped to be received within different ones of the base 29 apertures 31, 32, 33, 34 also seen in FIG. 3, structural support members 14, 15, 16, 17 carry storage 18 in a suspended manner above base 29 as seen in FIG. 2 within the central chilling cavity 40 of cooler 10. Embodiments of these supports are preferably formed from a rigid material such as metal or a robust plastic, and may define a cylindrical shape to cooperatively insert within the associated apertures. One or more storage members 18 can be placed atop structural support members 14, 15, 16, 17, preferably defining a thermal break 45 (i.e. no physical contact, utilizing air gapping to reduce thermal flow) between storage member(s) 18 and the other components of cooler 10 as seen in FIG. 2. In the preferred embodiment, storage container 18 is a collapsible polymeric crate of the type that can assume a substantially collapsed, horizontal posture so as to store and transport in a carton with the other components of cooler 10 (see FIG. 3). As the preferred internal chilling cavity 40, as defined by base 29, wall support 13, chilling members 21, 22, 23, 24, and top 20, is sized and shaped to accept at least two of the preferred storage members 18 therein. In an embodiment of cooler 10, graphic panel 19 may be disposed between bottom 12 and top 20 to further assist with insulating the internal chilling cavity as described above. Embodiments of panel 19 may be formed from paper, foam, cardboard, corrugated plastic, insulating foil, or other materials that will resist compressive pressure between bottom 12 and top 20 while maintaining thermal insulation from the ambient environment impacting the contents of cooler 10. The preferred embodiment of graphic panel 19 may include graphics or indicia thereon, but be formed out of material that can collapse and compress down into a storage and transportation posture as demonstrated in FIG. 3.

Preferred top 20 is a polymeric member that defines the same size and shape as bottom below it and that of graphic panel 19 therebetween. In the preferred embodiment, these members all define a generally octagonal shape, although it should be noted that other polygonal, circular, and other geometric shapes are also included within the scope of this invention. In addition to serving as the top of the interior chilling cavity of cooler 10, top 20 defines a central opening 43 and a plurality of recessed edges 25, 26, 27, 28, each sized and shaped to receive the respective formed on chilling members 21, 22, 23, 24. In the preferred embodiment, chilling members 21, 22, 23, 24 are substantially hollow, generally rectangular polymeric panels with a longitudinally extending major axis and a laterally extending minor axis. Each chilling member 21, 22, 23, 24 defines a wider body top portion having a respective perpendicularly extending lip 35, 36, 37, a centrally positioned opening or handle grip 45, 46, 47, 48 formed therein below the lip, and a comparatively narrower body bottom portion such that the body of the panel narrows towards the bottom to provide a significantly larger cooling portion proximate the top of the panel. Each chilling member defines a relatively thin outer wall in an effort to facilitate the transmission of cooling impetus into the interior chilling cavity 40 of cooler 10 (or draw the flow of heat out of interior chilling cavity). By deploying a plurality of chilling members 21, 22, 23, 24 about the interior chilling cavity, items positioned therein can be maintained in a chilled state for an extended period of time without coming into contact with free ice or water, greatly improving the hygienic manner in which the items are stored. Each chilling member preferably is formed by conventional blow molding of thermoplastic material. After forming, the panel is preferably filled with a cooling solution, in one non-limiting embodiment defined by approximately a 2% saline solution. Each panel 21, 22, 23, 24 may be individually frozen or chilled prior to use and includes respective lips 35, 36, 37, 38 across the top thereof for seating on respective recessed edges 25, 26, 27, 28 of top 20. The chilling members will provide sufficient cooling of or other items (not shown) placed within the storage member(s)

18 due to the slow rate of thaw the saline solution. Upon complete thawing or warming, the panel can be easily replaced with another frozen panel, and the thawed panel may be re-frozen. In the preferred embodiment, each of these panels defines a plurality of recesses formed within one side of the planar body portion each panel, said recesses for facilitating airflow and therefore more efficient cooling action cooler 10. While the present invention is intended for the use of cooling items contained within cooler 10, it should be noted that the same system, potentially with a different material within panels 21, 22, 23, 24, could be used to warm items instead of chilling them.

A method of thermally isolating items from the ambient environment is disclosed herein, and the steps include providing a cooler 10 with a plurality of wheels 11 rotatably affixed to a bottom 12, the bottom 12 sized and shaped to carry a base 29 in a central portion held in place by plurality of angularly disposed fins sized to receive cutouts formed within wall support 13 to circumscribe base 29 and frictional engage said fins and base 29. The base 29 defines one or more apertures, each aperture configured to receive a cylindrical structural support member therein. The one or more structural support members are sized to extend above base 29 to carry one or more storage members 18 positioned within a central chilling cavity defined by cooler 10, thereby establishing thermal break 45 from the ambient environment. The top 20, graphic panel 19, and bottom 12 all define similar or complementary cross-sectional shape, with the graphical panel 19 being slightly smaller from a circumferential perspective so that it may be permitted to engage within the side walls that extend from top 20 and bottom 12, respectively. Top 20 also defines a central opening 43 having a plurality of recessed edges 25, 26, 27, 28 therearound, each edge sized and shaped to receive the lip of a corresponding chilling panel thereon. Chilling panels 21, 22, 23, 24 are inserted through opening 43 whereby lips 35, 36, 37, 38 seat on respective edges 25, 26, 27, 28, maintaining the generally planar panels in a downwardly extending posture, as the lower body portion aligns and rests against the inner wall of wall 13 (FIG. 2) and thus defining an inner cooling cavity 40 in the shape of a cube and imparting a cooling impetus on the materials stored within storage member 18. In the preferred embodiment, lid 30 is advantageously closed to further insulate the inner chilling cavity. When the 2% saline solution within chilling panels 25, 26, 27, 28 is frozen and cooler 10 is disposed with the chilling cavity undisturbed, it has been determined that the temperature within cooler 10 will remain in low 30s (i.e. below 34° F. or about 1° C.) for approximately twenty-four (24) hours. If a panel thaws, or the temperature within cooler 10 becomes too warm, one or more of the panels can be removed and replaced while the removed panel can be refrozen, all without the material within cooler 10 contacting unsanitary ice or water. All of the components can be packaged into a single, 44"×28.5"×7" carton, and assembly or disassembly of cooler 10 may be completely performed without the use of tools, mechanical fasteners, or adhesives.

The illustrations and examples provided herein are for explanatory purposes and are not intended to limit the scope of the appended claims.

I claim:

1. A knockdown cooler comprising:
   at least one structural support member;
   a base with at least one aperture, wherein the at least one structural support member is sized and shaped to be inserted within the at least one aperture, and the at least one aperture is sized and shaped to receive a portion of the at least one structural support member therein;
   a storage member defined as a collapsible polymeric crate;
   at least one chilling member; and
   a top with at least one recessed edge, wherein the at least one recessed edge is sized and shaped to receive at least a portion of the at least one chilling member thereon,
   wherein the at least one chilling member cools a chilling cavity within the knockdown cooler without the use of electricity, free water, or free ice, and wherein the storage member is positioned within the chilling cavity and carried by the at least one structural support member above the base, thereby defining a thermal break between the storage member and the base.

2. The knockdown cooler of claim 1 further comprising a plurality of wheels rotatably affixed to a bottom, the bottom sized and shaped to carry the base.

3. The knockdown cooler of claim 2 further comprising a graphic panel disposed between the top and the bottom.

4. The knockdown cooler of claim 1 wherein the at least one structural support member is defined as four cylindrical structural support members.

5. The knockdown cooler of claim 1 wherein the at least one aperture is defined as four circular apertures.

6. The knockdown cooler of claim 1 wherein the at least one chilling member is defined as four chilling panels with a saline solution contained therein.

7. A knockdown cooler that can be assembled and disassembled without the use of tools, mechanical fasteners, or adhesives, the knockdown cooler comprising:
   a plurality of cylindrical structural support members;
   a base with a plurality of circular apertures, the number of apertures matching the number of structural support members, wherein the plurality of structural support members are sized and shaped to be inserted within different ones of the plurality of apertures, and each of the apertures is sized and shaped to receive a portion of different ones of the plurality of structural support members therein;
   one or more storage members, the one or more storage members defined as one or more collapsible polymeric crates;
   a plurality of chilling panels containing a saline solution therein;
   a top with a plurality of recessed edges, the number of recessed edges matching the number of plurality of chilling panels, wherein the plurality of recessed edges are each sized and shaped to receive different ones of the plurality of chilling members thereon,
   wherein the plurality of chilling members cools a chilling cavity within the knockdown cooler without the use of electricity, free water, or free ice, and wherein the one or more storage members is/are positioned within the chilling cavity and carried by the plurality of structural support members above the base, thereby defining a thermal break between the one or more storage members and the base.

8. The knockdown cooler of claim 7 further comprising a plurality of wheels rotatably affixed to a bottom, the bottom sized and shaped to carry the base.

9. The knockdown cooler of claim 8 further comprising a graphic panel disposed between the top and the bottom.

10. The knockdown cooler of claim 9 wherein the graphic panel, the top, and the bottom each define a complementary shape, and wherein the graphic panel defines a lesser circumference than the top and bottom.

11. The knockdown cooler of claim 7 wherein the plurality of structural support members are defined as four cylindrical structural support members.

12. The knockdown cooler of claim 7 wherein the plurality of apertures are defined as four circular apertures.

13. The knockdown cooler of claim 7 wherein the plurality of chilling panels are defined as four chilling panels.

14. The knockdown cooler of claim 7 further comprising a lid affixed to the top to provide further insulation to the knockdown cooler.

* * * * *